Oct. 4, 1927.  
A. WEILAND  
VEHICLE BUMPER  
Filed May 5, 1926  
1,644,046
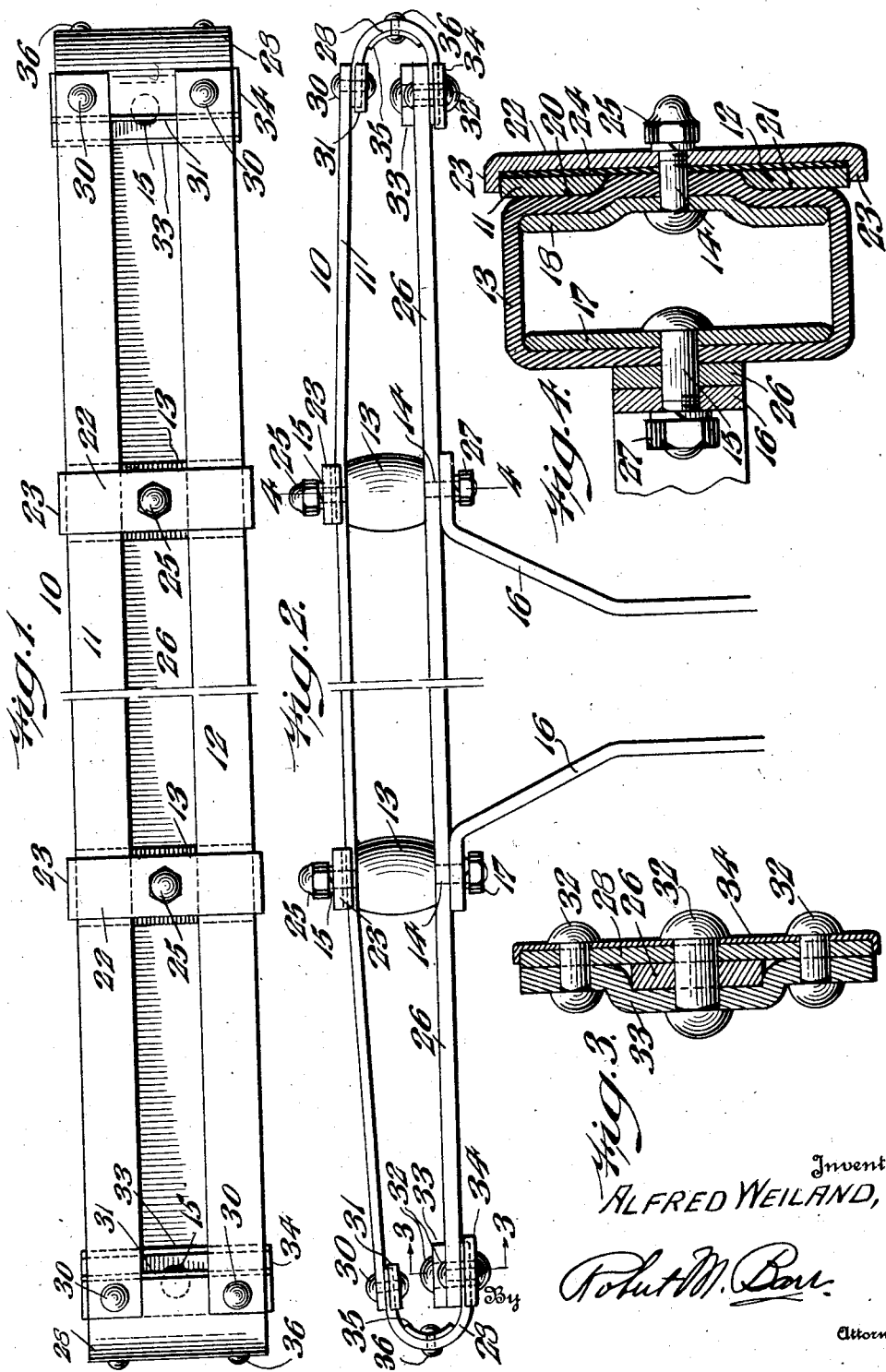
Inventor  
ALFRED WEILAND,  
By Robert M. Barr  
Attorney Patented Oct. 4, 1927.

1,644,046

UNITED STATES PATENT OFFICE.

ALFRED WEILAND, OF NESHANIC, NEW JERSEY, ASSIGNOR TO PNEUMATIC APPLIANCES CORPORATION, OF NEW YORK, N. Y., A CORPORATION OF DELAWARE.

VEHICLE BUMPER.

Application filed May 5, 1926. Serial No. 106,868.

The present invention relates to vehicle bumpers, and more particularly to an improved resilient shock absorbing impact receiving bumper for automobiles.

In automobile bumpers as heretofore constructed, the steel for manufacturing such bumpers is received from the mill in a tempered condition for use and has a finish suitable for use as a finished product or suitable to receive a nickel finish for use. In shaping this steel as received from the mill so that it will have the desired bumper contour, it is necessary to heat the steel to bend it to the desired shape, and as a consequence the heating and oxidation produces a scale which makes it necessary to grind the bumper bars to remove the scale and restore the surface to a finished condition to receive the nickel.

Some of the objects of the present invention are to provide a bumper, the bars of which are used in the same condition as when received from the steel mill; to provide a resilient shock absorbing bumper which in its manufacture does not require heating to bring it to its proper shape, and consequently the regrinding and retempering steps, ordinarily necessary, are eliminated; to produce a practical commercial bumper of attractive appearance without heating the steel during its conversion from the state received from the mill to the completed bumper; to provide an improved bumper having supplemental shock absorbing devices to supplement the action of the impact receiving bars; to provide a bumper wherein metal to metal contact between impact receiving and shock absorbing parts is eliminated; and to provide other improvements as will hereinafter appear.

In the accompanying drawings, Fig. 1 represents a front elevation of a vehicle bumper embodying one form of the present invention; Fig. 2 represents a plan of the same; Fig. 3 represents a section on line 3—3 of Fig. 2; and Fig. 4 represents a section on line 4—4 of Fig. 2.

Referring to the drawings, and more particularly to the form of the invention illustrated on sheet one, a vehicle bumper 10 is shown comprising two impact bars 11 and 12, arranged in superposed edge to edge parallel relation and suitably spaced in order to form an impact receiving surface of suitable width. The length of these bars is such as to extend across the front of an automobile to serve as a guard protecting the front fenders of the vehicle as well as the parts therebetween. These bars 11 and 12 are substantially straight throughout their length, though, as will later appear, their free end portions may be bent slightly rearwardly; that is, in the direction of the vehicle to be protected, though this bend is not such as to exceed the inherent elasticity of the spring stock as received from the mill. In other words, whatever rearward bending of the end portions of the impact bars there is, it is such as can take place without heating the bar, and the naturally flexed bars are held in flexed position, as will be presently pointed out.

For supporting the bars 11 and 12 upon the vehicle, supplemental shock absorbing devices are employed, consisting in the present instance of two cushioning elements 13 which are respectively fastened to the impact bars 11 and 12 by bolts 14 at one side and at the opposite side by bolts 15 to bracket members 16 by which the bumper is mounted upon the vehicle frame or other fixed part. As here shown, the cushioning elements 13 are formed of rubber molded into a substantially rectangular form having the long axis substantially equal to the width of the bumper as determined by the two impact bars 11 and 12. Preferably also the elements 13 are of hollow form and will more generally have a pressure medium molded therein to give a pneumatic effect. Also, during the molding operation, a rear plate 17 is molded into the element 13 to abut the rear wall, and a second plate 18 is molded therein to abut the front wall of the element 13, these plates serving respectively to hold the heads of the bolts 14 and 15 and distribute the clamping pressure. The front wall of the element 13 is molded with two recesses 20 and 21 of such a depth as to seat the impact bars 11 and 12 with their outer faces flush with the body portion of the element 13. A clamping plate 22, provided with laterally turned flanges 23, is arranged to seat transversely across and over the top and bottom edges of the bars 11 and 12, but in order to avoid metal to metal contact between otherwise abutting metal faces, a strip 24 of fabric or any other suitable material is interposed between the parts and all held clamped by a nut 25. At the opposite side of the element 13 the bolt 15 passes through a rear bar 26 and also the end portion of one of the brackets 16, the parts being firmly clamped together by a nut 27. Thus, as assembled, the two impact bars 11 and 12 are carried by two cushioning elements 13 of sufficient natural rigidity to prevent sagging or improper flexing, and these latter are held by the rear bar 26 which is supported upon the brackets 16. Preferably the rear bar 26 is of heavier section than the impact bars 11 and 12 in order to hold its straight shape, and to also efficiently take care of thrusts caused by impacts bordering upon the abnormal.

For the purpose of increasing the general shock absorbing characteristics of the bumper of the present invention and preserving the general straight line effect of the impact bars 11 and 12, the ends of the impact bars are connected by flexible fastenings to the rear bar 26. Each of these fastenings preferably consists of a substantially U-shaped strap 28, preferably of rubber, though it may be of any suitable flexible resilient fabric, having one leg fastened to the impact bars 11 and 12 by rivets 30 which also secure a backing plate 31 so that the leg is securely held. The other leg of the strap 28 is made fast to the rear bar 26 by clamping it by rivets 32 between a relatively heavy centering plate 33 and a face plate 34, the construction being such that metal to metal contact between the rear bar 26 and the plate 34 is avoided. The centering plate 33 is recessed to seat the rear bar 26 flush with the line of the joint between the centering plate 33 and the legs of the strap 28.

To preserve the general arcuate shape of the strap and to prevent wear or breaking along the flexing line of the strap 28, a reinforcing segment 35, preferably of metal and shaped to fit the contour of the inner wall of the strap 28, is anchored by rivets 36 to the aforesaid strap 28.

Thus a construction is provided which allows substantially free play to the ends of the impact bars and does not under any conditions transmit through the straps 28 the shock of a blow upon the impact bars to the rear bar 26. When a blow of sufficient force to collapse the ends of the impact bars 11 and 12 to their limit of movement occurs these ends then directly abut the fastenings of the rear bar ends and the rear bar 26 at that time comes into action to supplement the impact bars in absorbing the shock. This construction in addition to promoting flexibility and increased shock absorbing properties avoids the undesirable metal to metal contact between the rear and front bars of a bumper and does away with the direct transmission of an impact to the rear bar by way of a metal connection whatever its form.

From the foregoing it will now be apparent that a complete unitary vehicle bumper has been devised wherein metal connection between the impact bar or bars and the rear bar has been entirely eliminated and the only connections therebetween are by way of rubber, or rubberized fabric or any other equivalent flexible material. Thus in operation an impact received at the central portion of the bumper will be absorbed, if relatively light, by the impact bars 11 and 12, and if relatively heavy by the impact bars 11 and 12 plus the supplemental action of the cushioning elements. On the other hand, an impact received on either of the end portions will be absorbed if relatively light by the flexing of the ends of the impact bars and the resistance of the straps 28, and if relatively heavy by the flexing of the ends of the impact bars into contact with the fastenings for the rear bar so that the rear bar with its increased rigidity will take the brunt of the excess of the impact not only absorbing such excess but preventing bending of the impact bars beyond the point where a set bend would occur.

It will thus be evident that the bumper as a unit has no metal wearing surfaces, contacts or fastening devices which in ordinary bumper constructions cause loose joints, loose connections and attendant rattling.

Having thus described my invention, I claim:

1. A bumper construction comprising an impact bar, a rear bar, means for supporting said rear bar from the frame of a vehicle, resilient members connecting said impact bar and said rear bar between the ends thereof, and rubber or rubberized fabric respectively connecting the ends of said impact bar to the ends of said rear bar.

2. A bumper construction comprising an impact bar, a rear bar, means for supporting said rear bar from the frame of a vehicle, members of molded resilient material connecting said impact bar and said rear bar between the ends thereof, and molded resilient material respectively connecting the ends of said impact bar to the ends of said rear bar.

3. A bumper construction comprising impact bars, a rear bar, means for supporting said rear bar from the frame of a vehicle, members of molded resilient material connecting said impact bars and said rear bar between the ends thereof, and molded resilient material respectively connecting the ends of said impact bar to the ends of said rear bar.

4. A bumper construction comprising a pair of vertically spaced impact bars, a rear bar, means for supporting said rear bar from the frame of a vehicle, U-shaped straps of rubber or rubberized fabric interposed between the respective ends of said impact bars to the respective ends of said rear bar, means for fastening the respective ends of said impact bars to said straps, and means for fastening the respective ends of said rear bar to said straps.

5. A bumper construction comprising a pair of vertically spaced impact bars, a rear bar, means for supporting said rear bar from the frame of a vehicle, U-shaped straps of rubber or rubberized fabric interposed between the respective ends of said impact bars to the respective ends of said rear bar, means for fastening the respective ends of said impact bars to said straps, means for fastening the respective ends of said rear bar to said straps, and reinforcing segments respectively connected to said straps.

Signed at Philadelphia, county of Philadelphia, State of Pennsylvania, this 3rd day of May, 1926.

ALFRED WEILAND.